United States Patent
Yamamoto (10) Patent No.: US 9,863,971 B2
(45) Date of Patent: Jan. 9, 2018

(54) WHEEL SPEED SENSOR WITH A WATERPROOF STRUCTURE FOR OUTPUT WIRES

(71) Applicant: SUMITOMO WIRING SYSTEMS, LTD., Yokkaichi, Mie (JP)

(72) Inventor: Hironobu Yamamoto, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/217,054

(22) PCT Filed: Jan. 22, 2015

(86) PCT No.: PCT/JP2015/051611
§ 371 (c)(1),
(2) Date: Nov. 15, 2016

(87) PCT Pub. No.: WO2015/115288
PCT Pub. Date: Aug. 6, 2015

(65) Prior Publication Data
US 2017/0168080 A1    Jun. 15, 2017

(30) Foreign Application Priority Data
Jan. 29, 2014   (JP) .................................. 2014-014788

(51) Int. Cl.
*G01B 7/30*   (2006.01)
*G01P 1/02*   (2006.01)
*G01P 3/481*  (2006.01)

(52) U.S. Cl.
CPC .............. *G01P 1/026* (2013.01); *G01P 3/481* (2013.01)

(58) Field of Classification Search
CPC .. G01P 1/026; G01P 3/481; G01P 1/02; G01P 3/488; G01P 3/487; G01P 3/48; G01D 5/145; G01D 511/245; G01D 5/2451; G01D 5/00; G01B 7/30
USPC ..................................... 324/173–174, 207.25
See application file for complete search history.

(56) References Cited

U.S. PATENT DOCUMENTS

| 6,844,719 B2 * | 1/2005 | Tsuge ..................... G01P 1/026 324/174 |
| 2004/0080317 A1 * | 4/2004 | Collins ................ G01D 11/245 324/262 |
| 2004/0150390 A1 | 8/2004 | Tsuge et al. |

(Continued)

FOREIGN PATENT DOCUMENTS

| JP | 2004-251885 A | 9/2004 |
| JP | 2007-170963 A | 7/2007 |
| JP | 2008-241627 A | 10/2008 |

(Continued)

OTHER PUBLICATIONS

Apr. 7, 2015 International Search Report issued in International Application No. PCT/JP2015/051611.

(Continued)

*Primary Examiner* — Jay Patidar
(74) *Attorney, Agent, or Firm* — Oliff PLC (57) ABSTRACT

A novel wheel speed sensor that can produce advantageously and inexpensively with a novel structure that can reliably ensure the waterproof property of drawn-out portions of the output wire, regardless of a material of a coating member for coating output wires for a wheel speed sensor.

7 Claims, 6 Drawing Sheets (56) References Cited

U.S. PATENT DOCUMENTS

2009/0078043 A1* 3/2009 Tsuda ................ B29C 45/1671
                                                    73/431
2013/0154626 A1* 6/2013 Takasaki ............. G01D 11/245
                                                    324/207.25

FOREIGN PATENT DOCUMENTS

| JP | 2009-074993 A | 4/2009 |
|---|---|---|
| JP | 2011-069617 A | 4/2011 |

OTHER PUBLICATIONS

Apr. 7, 2015 Written Opinion in International Application No. PCT/JP2015/051611.

Uchiyama et al., Tsuyoshi, Biomagnetic field detection using very high sensitivity magnetoimpedance sensors for medical applications, Phys. Status Solidi A 206, No. 4, 639-643 (2009).

Nakayama et al., Shinsuke, Pulse-Driven Magnetoimpedance Sensor Detection of Cardiac Magnetic Activity, PLos ONE, www.plosone.org, Oct. 2011, vol. 6, Issue 10, e25834, pp. 1-6.

Melo et al., L. G. C., Optimization of the magnetic noise and sensitivity of giant magnetoimpedance sensors, Journal of Applied Physics 103, 033903, 6 pages, (2008) American Institute of Physics.

Nakayama et al., Shinsuke, Pulse-driven magnetoimpedance sensor detection of biomagnetic fileds in musculatures with spontaneous electric activity, Biosensors and Bioelectronics 27 (2011) pp. 34-39.

* cited by examiner

WHEEL SPEED SENSOR WITH A WATERPROOF STRUCTURE FOR OUTPUT WIRES

TECHNICAL FIELD

The present exemplary embodiments relate to a wheel speed sensor for measuring the rotational speed of the wheels of an automobile by detecting magnetic field fluctuations caused by rotation of a detection target that rotates together with the wheels, and to a method for producing such a wheel speed sensor.

BACKGROUND ART

Conventionally, automobiles include an antilock brake system for preventing the wheels from locking at the time of braking, a traction control system for preventing the wheels from slipping when the automobile starts to move, and the like, and wheel speed sensors for accurately measuring the rotational speed of the wheels are widely used as parts of such systems.

For example, JP 2007-170963A (Patent Document 1) discloses such a wheel speed sensor that has a configuration in which a rotation detection element that detects a magnetic field fluctuation caused by rotation of a rotor, which rotates together with the wheels and serves as a detection target, and converts the detected fluctuation into an electric signal, and parts of a pair of output wires connected to a pair of lead sections of this rotation detection element are buried in and covered with a synthetic resin cover part. Furthermore, the wheel speed sensor is configured to be fixed to the vehicle side via a fixation part provided on the cover part.

Meanwhile, in the wheel speed sensor having the conventional structure as described in Patent Document 1, the cover part is circumferentially molded directly on the outer circumferential surface of an exterior material provided externally on the output wires, and the cover part and the exterior material are fused to each other to ensure water stopping properties of the drawn-out portions of the output wires, in order to prevent water from entering the inside of the cover part via the output wires.

However, due to an increase in the number of in-vehicle electronic components in recent years, there are more and more cases where another electronic component is installed in the vicinity of the wheel speed sensor. In such a case, by putting the output wires of the wheel speed sensor and the output wires of the other electronic component together and accommodating them in a single exterior material so as to form one wire harness, reductions in the number of processing steps and in the cost are achieved. Accordingly, there are cases where the conventional water-stopping structure in which the output wires for the wheel speed sensor are fused to the cover part of the wheel speed sensor while being accommodated in the exterior material cannot be employed.

In other words, when output wires for a wheel speed sensor and output wires of another electronic component are accommodated in one exterior material so as to configure a wire harness, it is necessary to remove the exterior material of the wire harness in the vicinity of the wheel speed sensor to guide out the output wires for the wheel speed sensor, and to fuse the output wires directly to the cover part. However, the output wires for the wheel speed sensor are often coated with a synthetic resin material that is not likely to be fused to the cover part of the wheel speed sensor, and thus a gap may be created between the cover part and the output wires, making it difficult to ensure the waterproof property.

CITATION LIST

Patent Documents

Patent Document 1: JP 2007-170963A

SUMMARY

Technical Problem

The exemplary embodiments were made in view of the above-described circumstances, and the problem to be solved of the exemplary embodiments is to provide a novel wheel speed sensor production method that can advantageously and inexpensively produce a wheel speed sensor having a novel structure that can reliably ensure the waterproof property of drawn-out portions of output wires of the wheel speed sensor, regardless of a material of a coating member for the output wires. Furthermore, it is also an object of the exemplary embodiments to provide such a novel structure wheel speed sensor.

Solution to Problem

A first aspect of the exemplary embodiments relating to a wheel speed sensor production method is directed to a method for producing a wheel speed sensor including a rotation detection element that is configured to detect a magnetic field fluctuation caused by rotation of a detection target that rotates together with a wheel and to convert the detected magnetic field fluctuation into an electric signal, an output wire that is connected to the rotation detection element, a cover part that is made from a synthetic resin and covers the rotation detection element and a part of the output wire so that they are buried in the cover part, and a fixation part that is to be fixed to a vehicle, the method including: a primary molding step of molding a primary molded article including a tubular electric wire insertion part through which the output wire is to be inserted, using metal molds that are divided into two parts on the electric wire insertion part side and on the fixation part side in an axial direction of the electric wire insertion part, the electric wire insertion part projecting integrally from one side of the fixation part, and having a waterproofing member mounting portion having a smooth outer circumferential surface; a secondary molding step of molding the cover part and a latching projection in one piece in a state in which the rotation detection element arranged on the other side of the fixation part, and the primary molded article in which the output wire drawn out from the rotation detection element is arranged while being inserted through the electric wire insertion part are disposed at predetermined positions of the metal molds, the latching projection projecting radially outward of a base end part of the electric wire insertion part in a direction perpendicular to the axial direction; a waterproofing member attaching step of inserting the output wire through an electric wire insertion hole formed in one end of a tubular waterproofing member made from an elastic member in a state in which the output wire is in intimate or direct contact with the waterproofing member, and intimately or directly adhering and fixing an adhesion part formed in the other end of the waterproofing member to the waterproofing member mounting portion of the electric wire insertion part; and an outer tubular member attaching step of externally fitting and mounting an outer tubular member for holding the waterproofing member on the waterproofing member, and engaging an engagement part formed on the outer tubular member with the latching projection formed on the outer circumferential surface of the base end part of the electric wire insertion part.

According to the first aspect of the exemplary embodiments relating to the wheel speed sensor production method, first in the primary molding step, the fixation part and the electric wire insertion part that projects from one side of the fixation part are molded as a primary molded article using the metal molds that are divided into two parts on the electric wire insertion part side and on the fixation part side in an axial direction of the electric wire insertion part. Accordingly, it is possible to form the waterproofing member mounting portion having a smooth outer circumferential surface on which no parting line extending in the axial direction is formed over the entire circumference on the top end side of the outer circumferential surface of the electric wire insertion part.

That is, in the conventional wheel speed sensor, metal molds for use in molding the cover part are divided in the alignment direction of the rotation detection element, and lead sections and output wires thereof are aligned in the horizontal direction, that is, in a direction that is perpendicular to the axial direction and to the direction in which the output wire is drawn out. Accordingly, if the electric wire insertion part is molded at the same time as the molding of the cover part, it will be inevitable that a parting line of the molds that extends in the axial direction is formed on the outer circumferential surface of the electric wire insertion part, causing the problem that due to the presence of the parting line, a gap is created between the contact surfaces of the waterproofing member and the waterproofing member mounting portion, and no sufficient waterproof properties can be ensured. In one exemplary embodiment, the electric wire insertion part is molded in the primary molding step prior to the secondary molding step of molding the cover part, and thus it is possible to form the waterproofing member mounting portion having a smooth outer circumferential surface on which no parting line extending in the axial direction is formed.

Thereafter, the secondary molding step is performed to mold the cover part and the latching projection that projects from the base end part of the electric wire insertion part radially outward in the direction perpendicular to the axial direction in one piece, in a state in which the rotation detection element arranged on the other side of the fixation part, and the primary molded article in which the output wire drawn out from the rotation detection element is arranged while being inserted through the electric wire insertion part are disposed at predetermined positions of the metal molds. In the secondary molding step, there is no other choice to use metal molds that are divided in the direction perpendicular to the axial direction of the electric wire insertion part in order to mold the cover part and the latching projection projecting to the direction perpendicular to the axial direction, but the waterproofing member mounting portion that needs to have water-tightness has already been molded in the primary molding step so as to have a smooth outer circumferential surface on which no parting line extending in the axial direction is formed, thus preventing a parting line from adversely affecting the waterproof property of the wheel speed sensor.

Furthermore, since the latching projection projecting radially outward of the base end part of the electric wire insertion part in the direction perpendicular to the axial direction is formed in the secondary molding step, there is no need to use, in the primary molding step, a complicated metal mold structure in which while metal molds that are divided in the axial direction of the electric wire insertion part are used, a slide mold is partially used to form the latching projection projecting in the direction perpendicular to the axial direction of electric wire insertion part, making it possible to simplify the metal mold structure and the production process and to inexpensively produce the wheel speed sensor. Furthermore, since the cover part and the latching projection are mold in one piece in the secondary molding step, the degree of freedom of setting the position of the discharge port (gate) for a resin material in the secondary molding step is improved.

Moreover, since the cover part and the latching projection are provided in one piece in the secondary molding step using the primary molded article as a part of an insert, it is possible to simplify the assembling process of the wheel speed sensor and to advantageously ensure the rigidity of the entire wheel speed sensor.

The waterproofing member made from an elastic member is attached to the molded article that was molded through such primary molding step and secondary molding step. At that time, since an adhesion part of the waterproofing member that is externally fitted and mounted on the electric wire while being in intimate or direct contact therewith is intimately or directly adhered and fixed to the waterproofing member mounting portion on which no parting line extending in the axial direction is formed, it is possible to prevent formation of a gap between the contact surfaces of the waterproofing member and the electric wire insertion part, and to reliably ensure the water-tightness.

Furthermore, since the output wire is arranged while being inserted through the electric wire insertion hole provided in the end of the waterproofing member so as to be in intimate or direct contact therewith, the waterproofing member prevents water from entering the inside of the wheel speed sensor via the output wire. Accordingly, even if the output wire is coated with a coating member that has poor adhesiveness with respect to the cover part, by inserting the output wire through the electric wire insertion part and mounting the waterproofing member on the output wire and the electric wire insertion part in the state in which the output wire and the waterproofing member are in intimate or direct contact with each other according to the production method of one exemplary embodiment, it is possible to sufficiently ensure the waterproof property of the wheel speed sensor.

In addition, in the outer tubular member attaching step, the outer tubular member is externally fitted and mounted on the waterproofing member, and the engagement part formed on the outer tubular member is engaged with the latching projection that was molded in one piece with the cover part on the outer circumferential side of the base end part of the electric wire insertion part in the secondary molding step. Accordingly, the waterproofing member is held by the cover part via the outer tubular member, and thus it is possible to reliably maintain the waterproof property using the waterproofing member. Particularly, since the latching projection is provided in one piece with the cover part, the support rigidity of the waterproofing member via the outer tubular member is reliably ensured.

According to the wheel speed sensor production method of the present exemplary embodiments, it is possible to produce a wheel speed sensor that can sufficiently ensure the water-tightness of the drawn-out portion of the output wire inexpensively with a simple metal mold structure, even if the output wire is coated with the coating member that has poor adhesiveness with respect to the cover part.

A second aspect of the exemplary embodiments relating to the wheel speed sensor production method is the wheel speed sensor production method according to the first aspect, wherein the fixation part of the primary molded article has a through-hole that is formed through the fixation part in the axial direction in a region in the vicinity of the base end part of the electric wire insertion part, and in the secondary molding step, a tubular seat part is molded in the vicinity of the base end part of the electric wire insertion part, the latching projection is provided projecting from an outer circumferential surface of the tubular seat part, and the cover part and the tubular seat part are formed in one piece via a connection part made from a resin material injected into the through-hole.

According to the present exemplary embodiment, the cover part, and the tubular seat part and the latching projection, which are formed in the secondary molding step, are provided on both sides of the fixation part formed in the primary molding step, and can be formed in one piece via the connection part made from a resin material that was injected through the through-hole formed in the fixation part, the tubular seat part and the latching projection being provided in the base end part of the electric wire insertion part. Accordingly, it is possible to reliably ensure the adhesiveness of the cover part and the tubular seat part with respect to the fixation part, and the unity of the constituent components is maintained even when they are molded in two molding steps, achieving an improvement in the rigidity and durability of the wheel speed sensor itself.

A third aspect of the exemplary embodiments relating to the wheel speed sensor production method is directed to the wheel speed sensor production method according to the second aspect, wherein a discharge port for the resin material for use in molding the cover part, the tubular seat part, and the latching projection in the secondary molding step is arranged to be closer to the tubular seat part than to the fixation part of the primary molded article.

According to the present exemplary embodiment, the discharge port for the resin material for use in the secondary molding step is provided on the tubular seat part side distanced from the cover part side on which the rotation detection element is disposed with the fixation part of the primary molded article sandwiched therebetween. Accordingly, it is possible for the fixation part to prevent the residual stress that occurs in the vicinity of the discharge port at the time of resin injection from adversely affecting the vicinity of the rotation detection element, advantageously improving the positional accuracy and the like of the rotation detection element.

A first aspect of the exemplary embodiments relating to a wheel speed sensor is directed to a wheel speed sensor including: a rotation detection element that is configured to detect a magnetic field fluctuation caused by rotation of a detection target that rotates together with a wheel and to convert the detected magnetic field fluctuation into an electric signal; an output wire that is connected to a lead terminal of the rotation detection element; a cover part that is made from a synthetic resin and covers the rotation detection element and a part of the output wire so that they are buried in the cover part; and a fixation part that is to be fixed to a vehicle, wherein a tubular electric wire insertion part through which the output wire is to be inserted is provided projecting integrally from one side of the fixation part, and the cover part in which the rotation detection element and a part of the output wire are buried is arranged on the other side of the fixation part, wherein the electric wire insertion part has a waterproofing member mounting portion having a smooth outer circumferential surface, and has, on a base end side of the electric wire insertion part, a latching projection that is molded in one piece with the cover part and projects radially outward of the electric wire insertion part in a direction perpendicular to the axial direction, wherein a tubular waterproofing member made from an elastic member is externally fitted and mounted on the output wire drawn out from a top end side of the electric wire insertion part, the output wire is inserted through an electric wire insertion hole formed in one end of the waterproofing member while being in intimate or direct contact therewith, and an adhesion part formed in the other end of the waterproofing member is intimately or directly adhered and fixed to the waterproofing member mounting portion of the electric wire insertion part, and wherein an outer tubular member for holding the waterproofing member is externally fitted and mounted on the waterproofing member, and an engagement part provided on the outer tubular member is engaged with the latching projection formed on the outer circumferential side of the base end part of the electric wire insertion part.

According to the first aspect of the present exemplary embodiments relating to the wheel speed sensor, the electric wire insertion part projects integrally from one side of the fixation part, and the output wire is drawn outwardly from the rotation detection element buried in the cover part arranged on the other side of the fixation part, while being inserted through the electric wire insertion part. The waterproofing member mounting portion having a smooth outer circumferential surface on which no parting line extending in the axial direction is formed is provided on the outer circumferential surface of the front end part of this electric wire insertion part, and the adhesion part of the waterproofing member that is externally fitted and mounted on the drawn-out output wire in intimate or direct contact therewith is intimately or directly adhered and fixed to the waterproofing member mounting portion. Accordingly, the watertightness between the contact surfaces of the waterproofing member mounting portion of the electric wire insertion part and the waterproofing member is kept high. Furthermore, the output wire is arranged while being inserted through the electric wire insertion hole formed in an end of the waterproofing member so as to be in intimate or direct contact therewith, thus preventing water from entering the inside via the output wire. Therefore, even if the output wire is coated with a coating member that has poor adhesiveness with respect to the cover part, it is possible to ensure high waterproof property by inserting the output wire through the electric wire insertion part and mounting the waterproofing member on the output wire and the electric wire insertion part in intimate or direct contact therewith.

Moreover, the outer tubular member is externally fitted and mounted on the waterproofing member, and the engagement part formed on the outer tubular member is engaged with the latching projection that is formed in one piece with the cover part on the outer circumferential side of the base end part of the electric wire insertion part. Accordingly, the waterproofing member is held by the cover part via the outer tubular member, making it possible to reliably maintain the waterproof property using the waterproofing member. Particularly, since the latching projection is provided in one piece with the cover part, the support rigidity of the waterproofing member via the outer tubular member can be ensured reliably, and the waterproof property of the drawn-out portion of the output wire can be maintained more reliably.

A second aspect of the present exemplary embodiments relating to the wheel speed sensor is directed to the wheel speed sensor according to the first aspect, wherein in the circumference of the base end part of the electric wire insertion part, a tubular seat part is provided in one piece with the cover part, the latching projection is provided projecting from the outer circumferential surface of the tubular seat part, and the fixation part has a through-hole that is formed through the fixation part in the axial direction in a region in the vicinity of the base end part of the electric wire insertion part, the cover part and the tubular seat part being formed in one piece via a connection part that is inserted through the through-hole.

According to this aspect, the cover part, and the tubular seat part and the latching projection that are provided on two ends of the fixation part are formed in one piece via the connection part that is formed through the through-hole of the fixation part. Accordingly, it is possible to reliably ensure the adhesiveness of the cover part and the tubular seat part with respect to the fixation part, and to maintain the unity of the constituent components, achieving an improvement in the rigidity and durability of the wheel speed sensor itself.

A third aspect of the present exemplary embodiments relating to the wheel speed sensor is directed to the wheel speed sensor according to the first or second aspect, wherein the outer tubular member has an inner flange part that is opposite to the one end of the waterproofing member in the axial direction.

According to this aspect, since the inner flange part that is opposite to the one end of the waterproofing member in the axial direction is provided on the outer tubular member, it is possible to reliably prevent the waterproofing member from being shifted in the axial direction, and to reliably prevent the defect that the waterproofing member is disengaged from the waterproofing member mounting portion of the electric wire insertion part or the like, ensuring the waterproof property of the wheel speed sensor more reliably.

A fourth aspect of the present exemplary embodiments relating to the wheel speed sensor is directed to the wheel speed sensor according to any one of the first to third aspects, wherein the outer tubular member has a latching part that projects outward in a direction perpendicular to the axial direction, and a tubular electric wire cover member that is externally fitted and mounted on the output wire and the outer tubular member is latched with the latching part.

According to this aspect, the electric wire cover member that is externally fitted and mounted on the outer tubular member can further be supported by the outer tubular member, making it possible to further improve the waterproof property of the output wire drawn-out portion of the wheel speed sensor, and to obtain protection against an external shock or the like.

Advantageous Effects

According to the present exemplary embodiments, by molding the electric wire insertion part in the primary molding step prior to the secondary molding step of molding the cover part, it is possible to form the waterproofing member mounting portion having a smooth outer circumferential surface on which no parting line extending in the axial direction is formed, preventing the parting line from adversely affecting the waterproof property of the wheel speed sensor. Furthermore, by forming the latching projection on the outer circumferential side of the electric wire insertion part in the secondary molding step, there is no need to use, in the primary molding step, a complicated metal mold structure in which while the metal molds that are divided in the axial direction of the electric wire insertion part are used, a slide mold is partially used to form the latching projection on the electric wire insertion part. Furthermore, since the cover part and the latching projection are molded in one piece in the secondary molding step, the degree of freedom of setting the position of the discharge port (gate) for a resin material for use in the secondary molding step is improved. Furthermore, since the adhesion part of the waterproofing member is intimately or directly adhered and fixed to the waterproofing member mounting portion, and the output wire is arranged while being inserted through the electric wire insertion hole of the waterproofing member so as to be in intimate or direct contact therewith, it is possible to reliably ensure the waterproof property of the wheel speed sensor. Additionally, since the outer tubular member is externally fitted and mounted on the waterproofing member, the support rigidity of the waterproofing member via the outer tubular member is reliably ensured.

BRIEF DESCRIPTION OF DRAWINGS

FIG. 8 are plan views illustrating the secondary molding step (FIG. 8(*a*) illustrates a lower mold on which the primary molded article provided with the rotation detection member shown in FIG. 6 is placed, and FIG. 8(*b*) illustrates an upper mold).

DESCRIPTION OF EXEMPLARY EMBODIMENTS

Hereinafter, exemplary embodiments will be described with reference to the drawings.

FIGS. 1 to 9 show a wheel speed sensor 10 that is produced by a wheel speed sensor production method according to an exemplary embodiment. The wheel speed sensor 10 is widely used as a part of, for example, an antilock brake system for preventing the wheels from locking at the time of braking so as to accurately measure the rotational speed of the wheels, and includes a wheel speed sensor main body 12, a waterproofing member 14 that is intimately or directly adhered and fixed to a waterproofing member mounting portion 64 (described later) of the wheel speed sensor main body 12, an outer tubular member 16 that holds the waterproofing member 14, and an electric wire cover member 18 that is externally fitted and mounted on the outer tubular member 16. Also, the wheel speed sensor 10 is configured by assembling the waterproofing member 14, the outer tubular member 16, and the electric wire cover member 18 in the stated order to the wheel speed sensor main body 12 from the rear. Note that in the description below, "upper" refers to the upside of FIG. 2, "lower" refers to the downside of FIG. 2, "front" refers to the left of FIG. 1, and "rear" refers to the right of FIG. 1.

Figure 2:
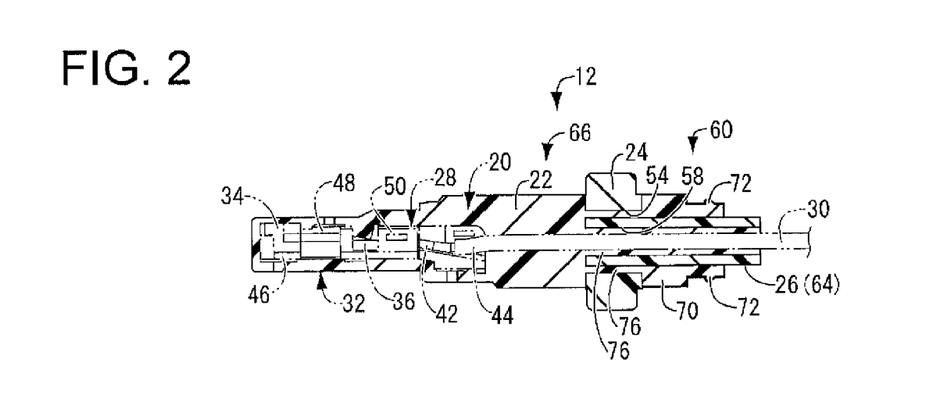
FIG. 2 is an enlarged view of a secondary molded article (wheel speed sensor main body) in a cross-section taken along the line II-II of FIG. 1.

As shown in FIG. 2, the wheel speed sensor main body 12 includes a rotation detection member 20, a cover part 22 that covers the rotation detection member 20, a fixation part 24 that is fixed to the vehicle side (not shown), and an electric wire insertion part 26 through which output wires 30 (described later) are inserted. Of them, the cover part 22, the fixation part 24, and the electric wire insertion part 26 are formed from a synthetic resin such as, for example, polypropylene (PP) or polyamide (PA), by injection molding or the like.

Figure 6:
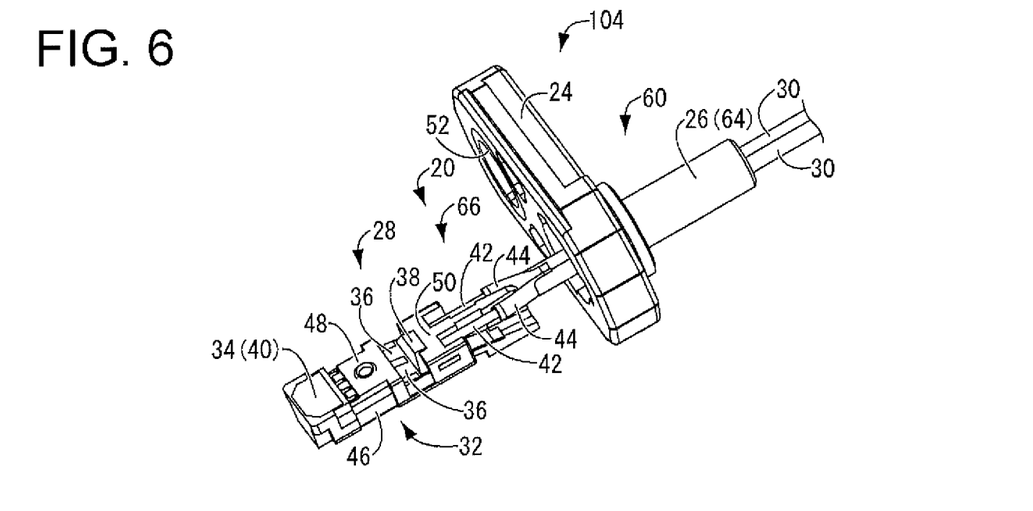
FIG. 6 is a perspective view of the wheel speed sensor immediately before a secondary molding step, illustrating a state in which a rotation detection member is mounted on the primary molded article shown in FIGS. 3 to 5.

As shown in FIG. 6, the rotation detection member 20 includes a rotation detection element 28, the output wires 30 that are connected to lead terminals 36 (described later) of the rotation detection element 28, and a holder member 32 that holds the rotation detection element 28 and parts of the output wires 30. The rotation detection element 28 includes a substantially rectangular plate-shaped magnetoelectric transducer 34, the two plate-shaped lead terminals 36 projecting rearward in substantially parallel to each other from one side of this magnetoelectric transducer 34, and a capacitor 38 that has a substantially rectangular parallelepiped shape and is connected to the two lead terminals 36. The magnetoelectric transducer 34 is an element that converts a change in a magnetic field into an electric signal and outputs the converted electric signal from the lead terminals 36. An upper face 40 of the magnetoelectric transducer 34 being arranged so as to face a rotor, which serves as a detection target and rotates together with the wheels (not shown), enables the magnetoelectric transducer 34 to detect a magnetic field fluctuation caused by rotation of the rotor and to convert the detected magnetic field fluctuation into an electric signal, allowing the accurate measurement of the rotational speed of the wheels.

The output wires 30 are respectively connected to the two lead terminals 36 of the rotation detection element 28 by soldering or the like. The two output wires 30 each have a configuration in which a core wire 42, which serves as a conductor and is a bundle of a plurality of wires made from metal such as copper or aluminum, is coated with a coating member 44 that is made from an ethylene-based resin, a styrene-based resin, or the like and has electrical insulating properties, and are soldered to the lead terminals 36 of the rotation detection element 28 with the coating members 44 removed in the front end portions. Furthermore, the two output wires 30 are connected to the rotation detection element 28 after the waterproofing member 14, the outer tubular member 16, and the electric wire cover member 18 are mounted on the output wires 30.

As shown in FIG. 6, the rotation detection element 28 having such a configuration is arranged and held on the holder member 32 in a state in which the magnetoelectric transducer 34 is located in the front and the upper face 40 of the magnetoelectric transducer 34 is directed upward. Here, the holder member 32 is formed from, for example, a synthetic resin such as polypropylene (PP) or polyamide (PA) by injection molding or the like, and is constituted by three components, namely, a base part 46, a first lid part 48, and a second lid part 50. The holder member 32 is configured to hold the rotation detection element 28 by accommodating the rotation detection element 28 in the base part 46 and being closed with the first lid part 48 and the second lid part 50. Note that the base part 46 and the lid parts 48 and 50 are fixed to each other by claw-like engagement (not shown) or the like, but may be fixed to each other by an adhesion method, a welding method, or the like. Furthermore, the holder member 32 has a recess and a protrusion for use in positioning metal molds when the cover part 22 is molded with respect to the rotation detection member 20, and thus its role is to position of the rotation detection member 20.

Furthermore, as shown in FIGS. 1 and 3 to 6, the fixation part 24 is substantially oval plate-shaped, and has a substantially circular bolt insertion hole 52 on one side in the longitudinal direction thereof and a through-hole 54 on the other side in the longitudinal direction thereof, the through-hole 54 having a diameter size slightly smaller than that of the bolt insertion hole 52. A C-shaped holding ring 56 made from metal is fitted in the bolt insertion hole 52, and allows more reliable bolting when a bolt (not shown) is inserted into the bolt insertion hole 52 to fix the fixation part 24 to the vehicle side, while preventing the inner circumferential surface of the bolt insertion hole 52 from being cut by the thread of the bolt.

On the other hand, a tubular electric wire insertion part 26, which is coaxial with the through-hole 54 and has an electric wire insertion hole 58 with a small diameter size, is formed in the inside of the through-hole 54, and projects integrally to one side 60 in the plate thickness direction of the fixation part 24. Furthermore, the electric wire insertion part 26 has, on the outer circumferential surface of the base part thereof, four bridge parts 62, which extend radially in the longitudinal and lateral directions, namely, in the radial direction of the electric wire insertion hole 58 at equal distances in the circumferential direction of the electric wire insertion hole 58 so as to reach the inner circumferential surface of the through-hole 54, and these bridge parts 62 connect the electric wire insertion part 26 to the fixation part 24. Note that the electric wire insertion part 26 has, on the top end side thereof, the waterproofing member mounting portion 64, and this waterproofing member mounting portion 64 is configured to have a smooth outer circumferential surface on which no parting line extending in the axial direction is formed. Such an outer circumferential surface is a smooth circumferential surface that has no flexion point over the entire circumference in the circumferential direction.

Figure 1:
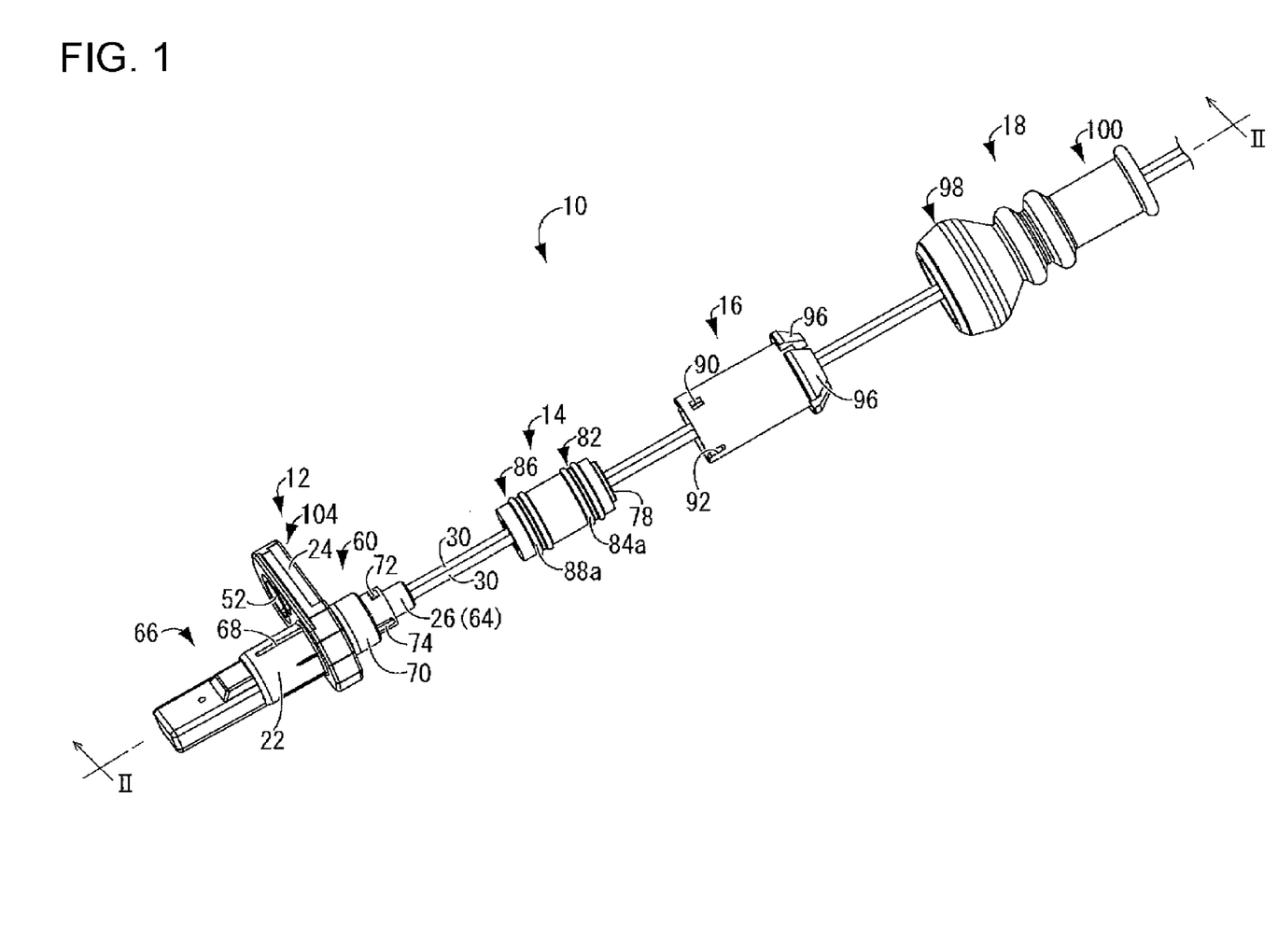
FIG. 1 is an exploded perspective view illustrating a wheel speed sensor produced by a wheel speed sensor production method according to an exemplary embodiment.

As shown in FIGS. 1 and 2, the cover part 22 is formed so as to cover the rotation detection element 28 and parts of the output wires 30 so that they are buried in the cover part 22, and is arranged on the other side 66 of the fixation part 24. A portion of this cover part 22 that covers the rotation detection element 28 is substantially block-shaped, whereas a portion of the cover part 22 that covers parts of the output wires 30 is substantially tubular, and the cover part 22 has, on its outer circumferential surface, a plurality of compression ribs 68 extending in the axial direction. Furthermore, a tubular seat part 70 is provided in one piece with the cover part 22 in the circumference of the base end part of the electric wire insertion part 26. The tubular seat part 70 has a cylindrical shape whose diameter in the front end part is smaller than that of the base end part thereof, and has, on the outer circumferential surface of the front end part thereof, latching projections 72 and engaging projection ridges 74 that project radially outward of the electric wire insertion part 26 in directions perpendicular to the axial.

Note that in the region of the fixation part 24 that is in the circumference of the base end part of the electric wire insertion part 26, the through-hole 54 is formed through the fixation part 24 in the axial direction, and the cover part 22 and the tubular seat part 70 are formed in one piece via a connection part 76 that penetrates the through-hole 54. Here, the connection part 76 is formed not only between the inner circumferential surface of the through-hole 54 and the outer circumferential surface of the electric wire insertion hole 58, but also between the inner circumferential surface of the electric wire insertion hole 58 and the outer circumferential surface of the output wire 30.

Figure 7:
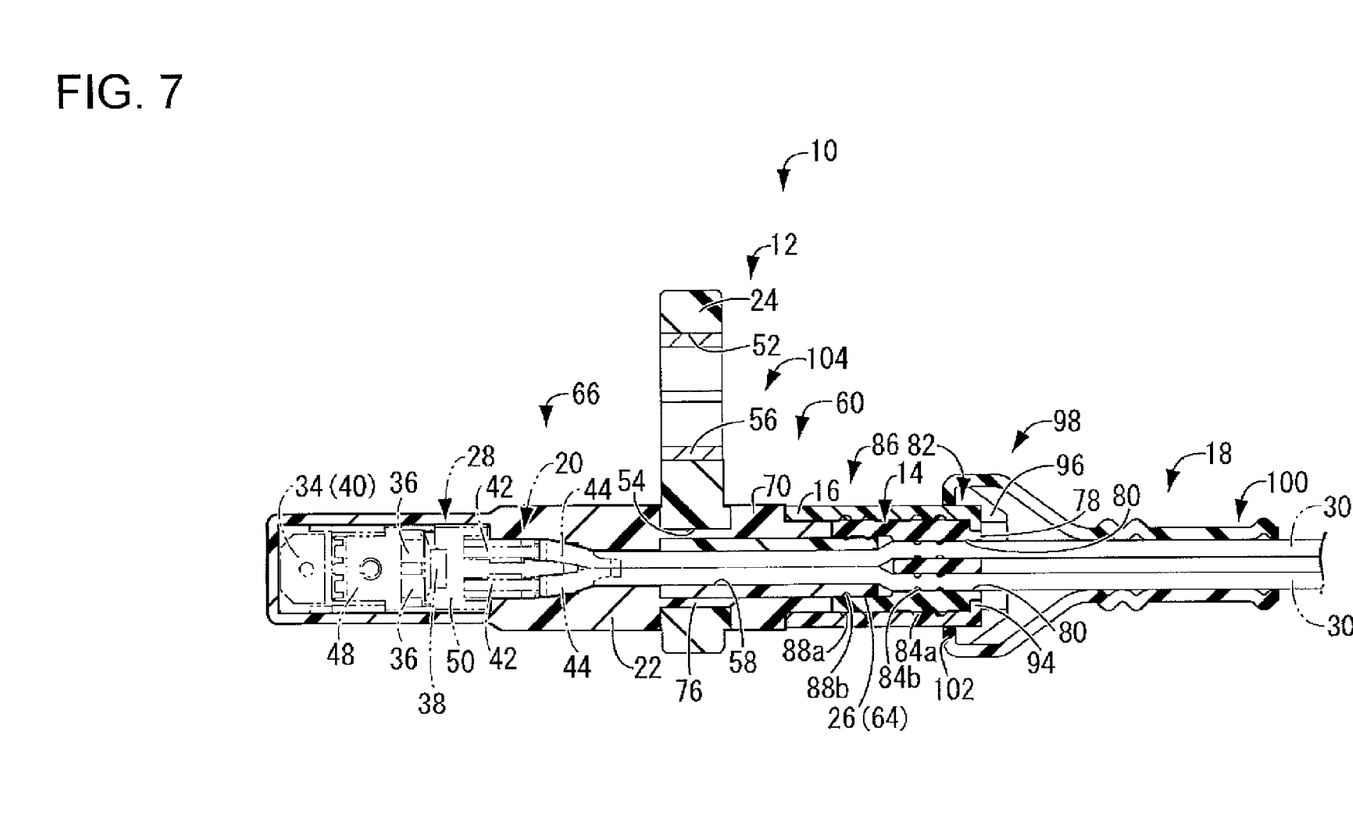
FIG. 7 is an enlarged horizontal cross-sectional view illustrating the state the wheel speed sensor shown in FIG. 1 is assembled.

As shown in FIGS. 1 and 7, the waterproofing member 14 is intimately or directly adhered and fixed to the waterproofing member mounting portion 64 of the thus configured wheel speed sensor main body 12 from the rear. The waterproofing member 14 is formed as one piece from, for example, a rubber material such as EPDM (ethylene-propylene rubber) or another elastic member. The waterproofing member 14 has the shape of a tube with a bottom and is open frontward, and this bottom 78 has a pair of electric wire insertion holes 80 through which the output wires 30 are respectively inserted. Also, a rear end part 82, which is one end of the waterproofing member 14, has compression ribs 84*a* and 84*b*, which respectively project entirely circumferentially from the outer circumferential surface of the waterproofing member 14 and the inner circumferential surfaces of the electric wire insertion holes 80, and a front end part 86, which is the other end of the waterproofing member 14, has compression ribs 88*a* and 88*b*, which respectively project entirely circumferentially from the outer and inner circumferential surfaces of the waterproofing member 14. Accordingly, when the tubular waterproofing member 14 made from an elastic member is externally fitted and mounted on the output wires 30 drawn out from the top end side of the electric wire insertion part 26, the compression ribs 88*b*, which are provided on the inner circumferential surfaces of the electric wire insertion holes 80, are compressed to the outer circumferential surfaces of the output wires 30 and thereby the output wires 30 are inserted through the electric wire insertion holes 80 while being in intimate or direct contact therewith. Furthermore, the compression rib 88*b*, which is provided on the inner circumferential surface of the front end part 86 serving as an adhesion part formed on the other end part of the waterproofing member 14, is compressed to the outer circumferential surface of the waterproofing member mounting portion 64, and thereby the front end part 86 the waterproofing member 14 is firmly and intimately/directly adhered and fixed to the waterproofing member mounting portion 64. In addition, the output wires 30 in the pair of electric wire insertion holes 80 are disposed in parallel to each other with a distance.

As shown in FIGS. 1 and 7, the outer tubular member 16 that holds the waterproofing member 14 is externally fitted and mounted on the waterproofing member 14 of the thus configured wheel speed sensor 10 from the rear. The outer tubular member 16 is substantially tubular and is formed from, for example, a synthetic resin such as polypropylene (PP) or polyamide (PA) by injection molding or the like. A pair of engagement parts 90 are formed through the front end part of the outer tubular member 16 at positions opposite to each other, and a pair of U-shaped notch parts 92 are formed at positions distanced from the respective engagement parts 90 by 90 degrees in the circumferential direction, and are open frontward. Furthermore, the inner circumferential surface of the rear end part of the outer tubular member 16 is provided with an inner flange part 94 at a position at which the inner flange part 94 is opposite to the rear end part 82, which is one end of the waterproofing member 14, in the axial direction, and an edge part of the rear end part of the outer tubular member 16 is provided with a latching part 96, which projects outward in a direction perpendicular to the axial direction and outward in the axial direction. Accordingly, it is configured such that when the outer tubular member 16 is externally fitted and mounted on the waterproofing member 14, the engagement parts 90 provided on the outer tubular member 16 are engaged with the latching projections 72 formed on the outer circumferential side of the base end part of the electric wire insertion part 26, and the notch parts 92 formed on the outer tubular member 16 are engaged with the engaging projection ridges 74 formed on the outer circumferential side of the base end part of electric wire insertion part 26. Furthermore, since the inner flange part 94 is provided at a position at which the inner flange part 94 is opposite to the rear end part 82, which is one end of the waterproofing member 14, in the axial direction, it is possible to reliably prevent the waterproofing member 14 from being shifted in the axial direction, and to reliably prevent the defect that the waterproofing member 14 is disengaged from the waterproofing member mounting portion 64, or the like, ensuring the waterproof property of the wheel speed sensor 10 more reliably. Furthermore, the compression ribs 84*b* and 88*b* provided on the outer circumferential surface of the waterproofing member 14 are more intimately or directly adhered and fixed to the inner circumferential surface of the outer tubular member 16 by being compressed thereto.

Furthermore, as shown in FIGS. 1 and 7, the electric wire cover member 18 is externally fitted and mounted on the outer tubular member 16 of the thus configured wheel speed sensor 10 from the rear, so as to complete the wheel speed sensor 10. The electric wire cover member 18 is formed as one piece from, for example, a rubber material such as EPDM (ethylene-propylene rubber) or another elastic member. The electric wire cover member 18 is substantially tubular, and one end thereof, that is, a front end part 98 has a diameter size greater than that of the other end thereof, that is, the rear end part 100. The inner diameter size of the front end part 98 of the electric wire cover member 18 is substantially the same as the outer diameter size of the latching part 96 of the outer tubular member 16, and the inner circumferential surface of the front end part 98 of the electric wire cover member 18 is provided with an inner flange part 102 whose inner diameter size is substantially the same as the outer diameter size of the outer tubular member 16. Furthermore, the inner diameter size of the rear end part 100 of the electric wire cover member 18 is substantially the same as the greatest distance between the positions of the two output wires 30 that are distanced in parallel to each other. Accordingly, the front end part 98 of the electric wire cover member 18 is externally fitted and mounted on the rear end part of the outer tubular member 16 while the electric wire cover member 18 is latched with the latching part 96 of the outer tubular member 16 using the inner flange part 102 of the front end part 98 of the electric wire cover member 18, and the rear end part 100 of the electric wire cover member 18 is externally fitted and mounted on the output wires 30. Accordingly, the outer tubular member 16 can further support the electric wire cover member 18 that is externally fitted and mounted thereon, making it possible to further improve the waterproof property of the drawn-out portions of the output wires 30 of the wheel speed sensor 10 and to protect the output wires 30 from an external impact or the like.

Figure 3:
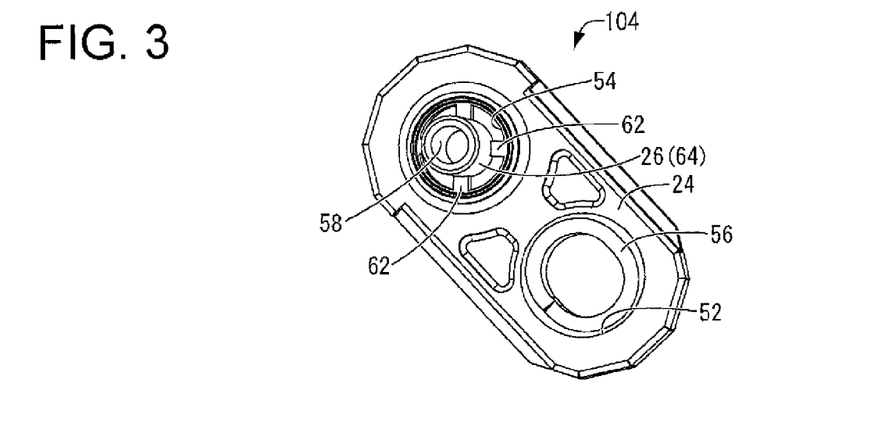
FIG. 3 is a perspective view of a primary molded article shown in FIG. 1.
Figure 4:
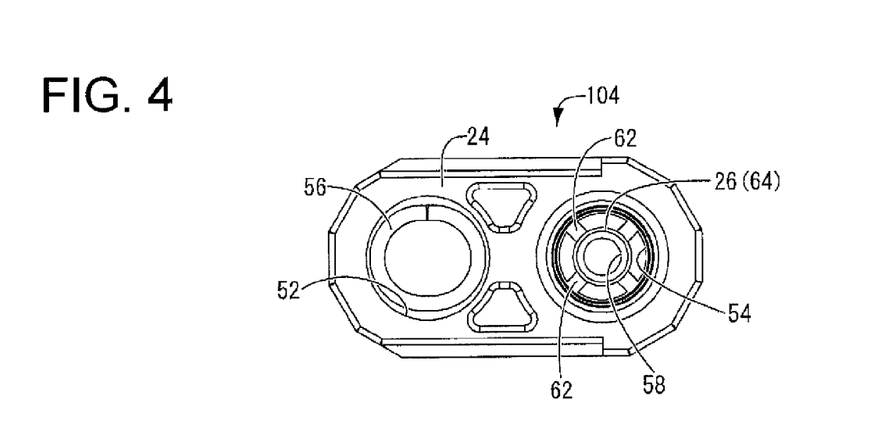
FIG. 4 is a plan view of the primary molded article shown in FIG. 1.
Figure 5:
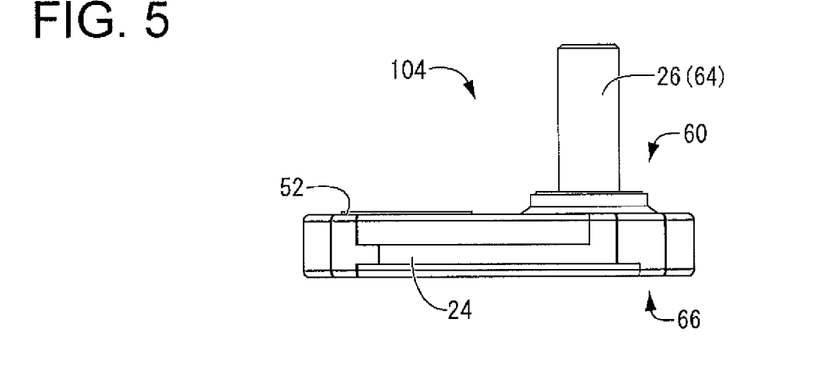
FIG. 5 is a side view of the primary molded article shown in FIG. 1.

The following will describe an exemplary embodiment that relates to a method for producing the wheel speed sensor 10 with reference to FIGS. 1 to 9. First, a primary molded article 104 as shown in FIGS. 3 to 5 is prepared. The primary molded article 104 includes the fixation part 24 and the tubular electric wire insertion part 26, which is formed projecting integrally to one side 60 in the plate thickness direction of the fixation part 24 and through which the output wires 30 are inserted. More specifically, the primary molded article 104 is formed by molding using metal molds (not shown) that are divided into two parts on the electric wire insertion part 26 side and on the fixation part 24 side in the axial direction of the electric wire insertion part 26. Accordingly, it is possible to form the waterproofing member mounting portion 64 such that it has a smooth outer circumferential surface on which no parting line extending in the axial direction is formed, in at least the front end portion of the electric wire insertion part 26 (in the present exemplary embodiment, no parting line is formed on the entire outer circumferential surface of the electric wire insertion part 26). The primary molded article 104 having such a configuration is prepared in the primary molding step.

Figure 8A:
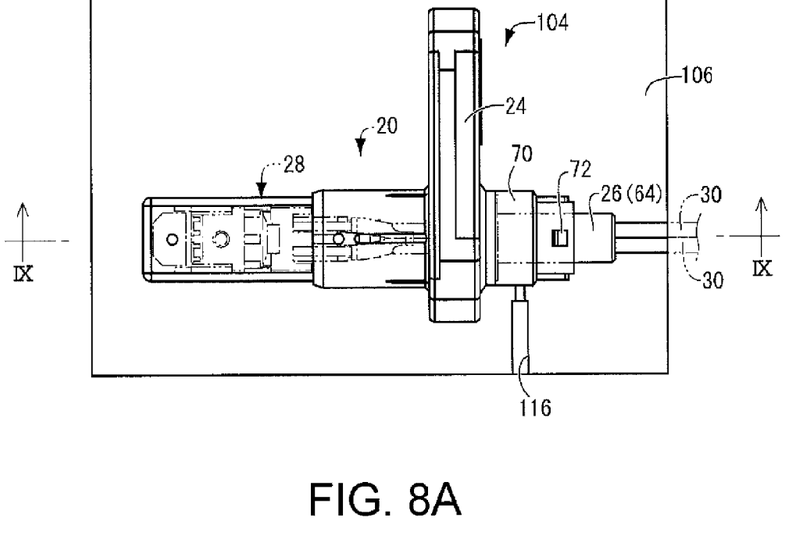
Figure 8B:
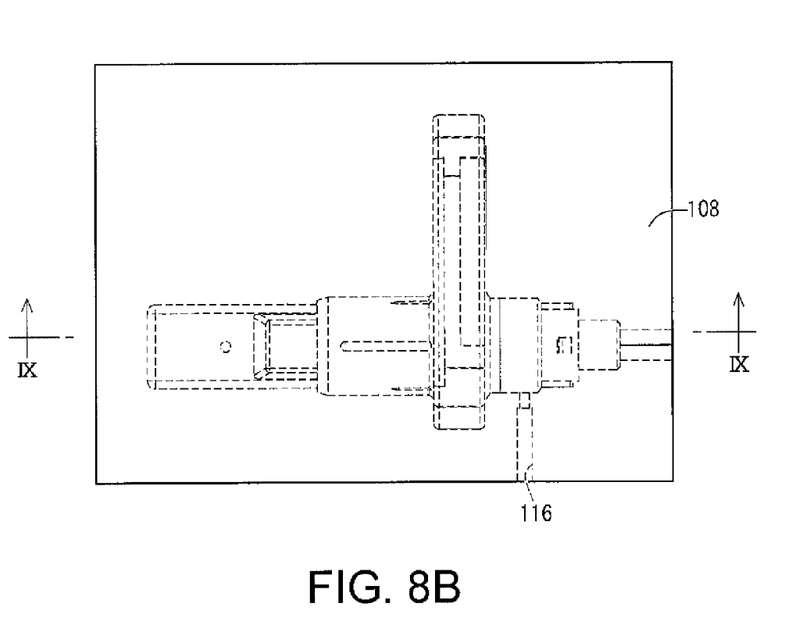
Figure 9:
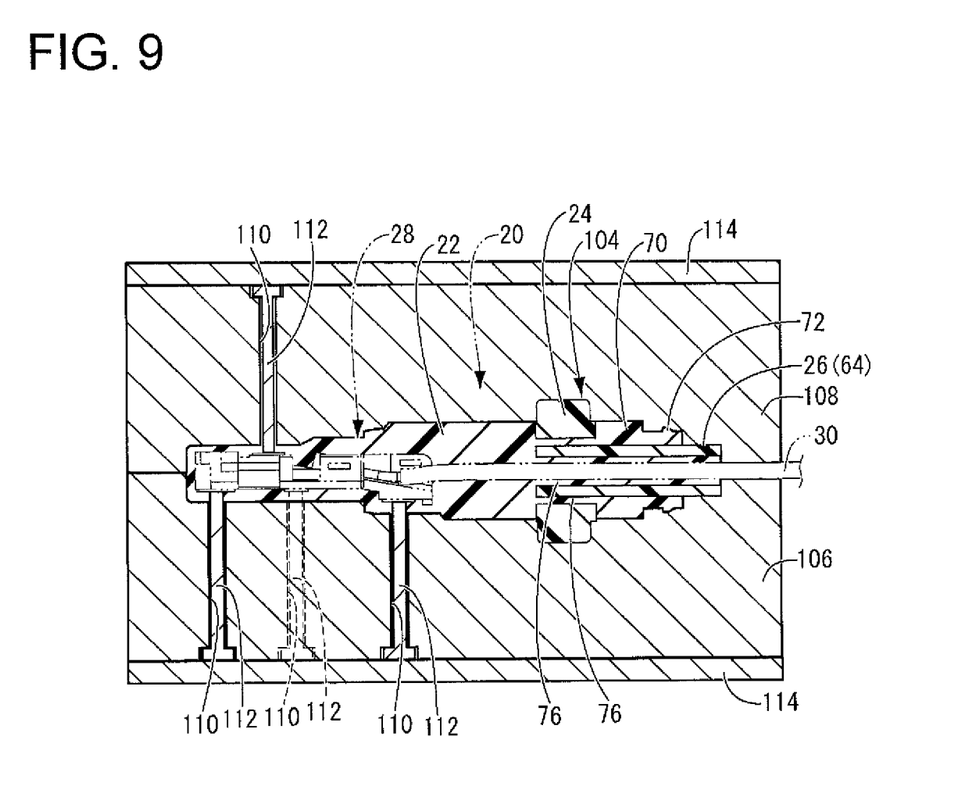
FIG. 9 is a cross-sectional view taken along the line IX-IX of FIG. 8, illustrating the state after the secondary molding step that is performed with the upper mold fitted to the lower mold on which the primary molded article provided with the rotation detection member is placed.

Then, as shown in FIGS. 6 and 8 to 9, the rotation detection element 28 and the holder member 32 are arranged on the other side 66 in the plate thickness direction of the fixation part 24, the output wires 30 drawn out from the rotation detection element 28 are arranged while being inserted through the electric wire insertion part 26, then the primary molded article 104 is arranged at a predetermined position of a substantially block-shaped lower mold (metal mold) 106, and an upper mold (metal mold) 108 is mounted thereon. Pin receiving holes 110 having a substantially T-shaped cross-section that are formed in the lower mold (metal mold) 106 and the upper mold (metal mold) 108 respectively receive push pins 112, which have substantially the same shape as the pin receiving holes 110 and have a size slightly smaller than that of the pin receiving holes 110, and the outward openings of the pin receiving holes 110 are closed and covered with base plates 114. Note that although not shown in the cross-section of FIG. 9, two push pins 112 that are distanced with respect to each other in the direction perpendicular to the drawing surface are arranged between the push pins 112 on both right and left sides of the lower mold 106 (in FIG. 9, only one push pin 112 located on the rear side of the cross-section is shown with dotted lines). Accordingly, the rotation detection element 28 is accommodated in the metal molds while being supported by the five push pins 112. Thereafter, the cover part 22, the tubular seat part 70, and the latching projections 72 are molded in one piece by injecting a resin material from a discharge port 116. Here, as shown in FIG. 8, the discharge port 116 is arranged to be closer to the tubular seat part 70 of the primary molded article 104 than to the fixation part 24. As a result, the tubular seat part 70 is molded in the circumference of the base end part of the electric wire insertion part 26, the latching projections 72 are provided projecting from the outer circumferential surface of the tubular seat part 70, and the cover part 22 and the tubular seat part 70 are formed in one piece via the connection part 76 formed from a resin material injected into the through-hole 54. This series of operations is executed in the secondary molding step.

After the secondary molding step, a waterproofing member attaching step is executed in which the waterproofing member 14 is intimately or directly adhered and fixed to the waterproofing member mounting portion 64 of the wheel speed sensor main body 12 that is a secondary molded article from the rear. With this procedure, the output wires 30 are inserted through the electric wire insertion holes 80 formed in the rear end part 82, which is one end of the waterproofing member 14, while being in intimate or direct contact therewith, and the compression rib 88b provided on the inner circumferential surface of the front end part 86 of the waterproofing member 14 is firmly and intimately/directly adhered and fixed to the outer circumferential surface of the waterproofing member mounting portion 64, by being compressed thereto.

Furthermore, after the waterproofing member attaching step, an outer tubular member attaching step is executed in which the outer tubular member 16 for supporting the waterproofing member 14 is externally fitted and mounted on the waterproofing member 14 from the rear. In this procedure, the engagement parts 90 provided on the outer tubular member 16 are engaged with the latching projections 72 formed on the outer circumferential side of the base end part of the electric wire insertion part 26, and the notch parts 92 provided on the outer tubular member 16 are engaged with the engaging projection ridges 74 formed on the outer circumferential side of the base end part of the electric wire insertion part 26.

Also, after the outer tubular member attaching step, an electric wire cover member attaching step is executed in which the electric wire cover member 18 is externally fitted and mounted on the outer tubular member 16 from the rear. As a result, the electric wire cover member 18 is latched with the latching part 96 of the outer tubular member 16 using the inner flange part 102 of the front end part 98 of the electric wire cover member 18, and the rear end part 100 of the electric wire cover member 18 is externally fitted and mounted on the output wires 30. The production of the wheel speed sensor 10 according to the production method of the present exemplary embodiment is thus completed.

According to the inventive method for producing the wheel speed sensor 10 having such a structure, the electric wire insertion part 26 is molded in the primary molding step prior to the secondary molding step of molding the cover part 22, and thus it is possible to provide the waterproofing member mounting portion 64 with an outer circumferential surface on which no parting line extending in the axial direction is formed. That is, in conventional wheel speed sensors, metal molds for use in molding the cover part are divided in a direction perpendicular to the axial direction, namely, in a direction perpendicular to the extending direction of the output wires, and thus if the electric wire insertion part is molded at the same time as the molding of the cover part, it will be inevitable that a parting line extending in the axial direction is formed on the outer circumferential surface of the electric wire insertion part, causing the problem that a gap is created between the contact surfaces of the waterproofing member and the waterproofing member mounting portion, and no sufficient waterproof properties can be ensured, but this problem can be solved.

Note that in the secondary molding step, there is no other choice to use the metal molds 106 and 108 that are divided in the direction perpendicular to the axial direction of the electric wire insertion part 26 since it is necessary to mold the cover part 22 and the latching projections 72, which project to the direction perpendicular to the axial direction, but the waterproofing member mounting portion 64 that needs to have water-tightness has already been molded in the primary molding step so as to have a smooth outer circumferential surface on which no parting line extending in the axial direction is formed, thus preventing the waterproof property of the wheel speed sensor 10 from being adversely affected.

Furthermore, since the latching projections 72 of the electric wire insertion part 26 are configured to be formed in the secondary molding step, it is not necessary to use, in the primary molding step, a complicated metal mold structure, as in the conventional case, in which while metal molds that are divided in the axial direction of the electric wire insertion part are used, a slide mold is partially used to form the latching projections projecting in the direction perpendicular to the axial direction of the electric wire insertion part, making it possible to simplify the metal mold structure and the production process and to inexpensively produce the wheel speed sensor 10. Furthermore, since the cover part 22 and the latching projection 72 are molded in one piece in the secondary molding step, the degree of freedom of setting the position of the discharge port 116 for a resin material in the secondary molding step is improved. Furthermore, since the cover part 22 and the latching projection 72 are provided in one piece using the primary molded article 104 as a part of an insert in the secondary molding step, it is possible to simplify the production process of the wheel speed sensor 10 and to advantageously ensure the rigidity of the entire wheel speed sensor 10.

The waterproofing member 14 is attached to the waterproofing member mounting portion 64 of the wheel speed sensor main body 12 molded through such primary molding step and secondary molding step. Since the waterproofing member mounting portion 64 includes no parting line extending in the axial direction, it is possible to prevent formation of a gap between the opposite surfaces of the waterproofing member mounting portion 64 and the waterproofing member 14, and to reliably ensure the watertightness. Furthermore, since the output wires 30 are arranged while being inserted through the electric wire insertion holes 80 of the waterproofing member 14 so as to be in intimate or direct contact therewith, water is prevented from entering the inside of the wheel speed sensor 10 via the output wires 30. Accordingly, even if the output wires 30 are coated with the coating member 44 that has poor adhesiveness with respect to the cover part 22, it is possible to sufficiently ensure the waterproof property of the wheel speed sensor 10.

Furthermore, in the outer tubular member attaching step, the waterproofing member 14 is held by the cover part 22 via the outer tubular member 16 by the outer tubular member 16 being externally fitted and mounted on the waterproofing member 14 and the engagement parts 90 being engaged with the latching projections 72, and thus it is possible to reliably maintain the waterproof property using the waterproofing member 14. Particularly, since the latching projections 72 are provided in one piece with the cover part 22, it is possible to reliably ensure the support rigidity of the waterproofing member 14 via the outer tubular member 16.

According to the method for producing the wheel speed sensor 10 of the present exemplary embodiment, even if the coating members 44 of the output wires 30 are made from a material that has poor adhesiveness with respect to the cover part 22, it is possible to use a simple metal mold structure to inexpensively produce the wheel speed sensor 10 that can ensure sufficient water-tightness of the drawn-out portions of the output wires 30.

Furthermore, the cover part 22 and the tubular seat part 70 that are formed in the secondary molding step can be formed on two sides in the plate thickness direction of the fixation part 24 and are formed in one piece via the connection part 76. Accordingly, it is possible to reliably ensure the adhesiveness of the cover part 22 and the tubular seat part 70 with respect to the fixation part 24, and the unity of the constituent components is maintained even when they are molded in two molding steps, achieving an improvement in the rigidity and durability of the wheel speed sensor 10 itself. Furthermore, the discharge port 116 for use in the secondary molding step is provided on the one side 60 in the plate thickness direction of the fixation part 24, that is, on the tubular seat part 70 side on which the rotation detection element 28 is not provided. Accordingly, it is possible for the fixation part 24 to prevent the residual stress that occurs in the vicinity of the discharge port 116 at the time of injection of a synthetic resin from adversely affecting the vicinity of the rotation detection element 28, advantageously improving the positional accuracy and the like of the rotation detection element 28.

An exemplary embodiment has been described in detail so far, but the claimed invention is not limited to the specific description thereof. For example, in the present exemplary embodiment, the electric wire cover member 18 has been described as a constituent component of the wheel speed sensor 10, but the electric wire cover member 18 is not essential.

LIST OF REFERENCE NUMERALS

10: Wheel speed sensor,
14: Waterproofing member,
16: Outer tubular member,
18: Electric wire cover member,
22: Cover part,
24: Fixation part,
26: Electric wire insertion part,
28: Rotation detection element,
30: Output wire,
36: Lead terminals,
54: Through-hole,
60: One side,
64: Waterproofing member mounting portion,
66: The other side,
70: Tubular seat part,
72: Latching projection,
76: Connection part,
80: Electric wire insertion hole,
86: Front end part (adhesion part),
90: Engagement part,
94: Inner flange part,
96: Latching part,
104: Primary molded article,
106: Lower mold (metal mold),
108: Upper mold (metal mold),
116: Discharge port

The invention claimed is:

1. A wheel speed sensor for use with a wheel, the wheel speed sensor comprising:
   a rotation detection element configured to: (i) detect a magnetic field fluctuation caused by rotation of a detection target that rotates together with the wheel, and (ii) convert the detected magnetic field fluctuation into an electric signal;
   an output wire connected to a lead terminal of the rotation detection element;
   a cover part made from a synthetic resin and covers the rotation detection element and a part of the output wire; and
   a fixation part fixed to a vehicle, wherein:

a tubular electric wire insertion part through which the output wire is to be inserted is provided projecting integrally from one side of the fixation part, and the cover part in which the rotation detection element and a part of the output wire are buried is arranged on the other side of the fixation part, the electric wire insertion part has a waterproofing member mounting portion having a smooth outer circumferential surface, and has, on a base end side of the electric wire insertion part, a latching projection that is molded in one piece with the cover part and projects radially outward of the electric wire insertion part in a direction perpendicular to the axial direction, a tubular waterproofing member made from an elastic member is externally fitted and mounted on the output wire drawn out from a top end side of the electric wire insertion part, the output wire is inserted through an electric wire insertion hole formed in one end of the waterproofing member while being in contact therewith, and an adhesion part formed in the other end of the waterproofing member is adhered and fixed to the waterproofing member mounting portion of the electric wire insertion part, and an outer tubular member for holding the waterproofing member is externally fitted and mounted on the waterproofing member, and an engagement part provided on the outer tubular member is engaged with the latching projection formed on the outer circumferential side of the base end part of the electric wire insertion part.

2. The wheel speed sensor according to claim 1, wherein in the circumference of the base end part of the electric wire insertion part, a tubular seat part is provided in one piece with the cover part, the latching projection projects from the outer circumferential surface of the tubular seat part, and the fixation part has a through-hole that is formed through the fixation part in the axial direction in a region in the vicinity of the base end part of the electric wire insertion part, the cover part and the tubular seat part being formed in one piece via a connection part that is inserted through the through-hole.

3. The wheel speed sensor according to claim 1, wherein the outer tubular member has an inner flange part that is opposite to the one end of the waterproofing member in the axial direction.

4. The wheel speed sensor according to claim 1, wherein the outer tubular member has a latching part that projects outward in a direction perpendicular to the axial direction, and a tubular electric wire cover member that is externally fitted and mounted on the output wire and the outer tubular member is latched with the latching part.

5. The wheel speed sensor according to claim 2, wherein the outer tubular member has an inner flange part that is opposite to the one end of the waterproofing member in the axial direction.

6. The wheel speed sensor according to claim 2, wherein the outer tubular member has a latching part that projects outward in a direction perpendicular to the axial direction, and a tubular electric wire cover member that is externally fitted and mounted on the output wire and the outer tubular member is latched with the latching part.

7. The wheel speed sensor according to claim 3, wherein the outer tubular member has a latching part that projects outward in a direction perpendicular to the axial direction, and a tubular electric wire cover member that is externally fitted and mounted on the output wire and the outer tubular member is latched with the latching part.

* * * * *